United States Patent
Walter et al.

(10) Patent No.: US 10,596,766 B2
(45) Date of Patent: Mar. 24, 2020

(54) METHOD FOR WELDING A POLYOLEFIN PLASTIC AND A PLASTIC BASED ON A POLYMER CONTAINING CARBONYL GROUPS

(71) Applicant: Henkel AG & Co. KGaA, Duesseldorf (DE)

(72) Inventors: Pablo Walter, Cologne (DE); Norman Friedrich, Duesseldorf (DE); Lina Gonzalez, Munich (DE); Thomas Haertig, Munich (DE); Hendrik Luetzen, Duesseldorf (DE); Dirk Kasper, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 152 days.

(21) Appl. No.: 15/934,347

(22) Filed: Mar. 23, 2018

(65) Prior Publication Data

US 2018/0207883 A1  Jul. 26, 2018

Related U.S. Application Data

(63) Continuation of application No. PCT/EP2016/074656, filed on Oct. 14, 2016.

(30) Foreign Application Priority Data

Oct. 16, 2015 (EP) .................... 15190210

(51) Int. Cl.
| | | |
|---|---|---|
| *C08F 22/06* | (2006.01) | |
| *B29C 65/40* | (2006.01) | |
| *B29C 65/00* | (2006.01) | |
| *C09J 5/02* | (2006.01) | |
| *B29C 65/02* | (2006.01) | |
| *C08F 210/16* | (2006.01) | |
| *C08L 23/06* | (2006.01) | |
| *C08L 23/08* | (2006.01) | |
| *C08L 35/00* | (2006.01) | |
| *B29K 67/00* | (2006.01) | |
| *B29K 77/00* | (2006.01) | |
| *B29C 65/18* | (2006.01) | |
| *B29C 65/14* | (2006.01) | |
| *B29C 65/38* | (2006.01) | |
| *B29C 65/04* | (2006.01) | |
| *B29C 65/06* | (2006.01) | |
| *B29C 65/08* | (2006.01) | |
| *B29C 65/16* | (2006.01) | |

(Continued)

(52) U.S. Cl.
CPC ............ *B29C 65/405* (2013.01); *B29C 65/02* (2013.01); *B29C 66/02* (2013.01); *B29C 66/026* (2013.01); *B29C 66/71* (2013.01); *B29C 66/712* (2013.01); *C08F 22/06* (2013.01); *C08F 210/16* (2013.01); *C08L 23/06* (2013.01); *C08L 23/0815* (2013.01); *C08L 35/00* (2013.01); *C09J 5/02* (2013.01); *B29C 65/04* (2013.01); *B29C 65/06* (2013.01); *B29C 65/0618* (2013.01); *B29C 65/0627* (2013.01); *B29C 65/0636* (2013.01); *B29C 65/0672* (2013.01); *B29C 65/08* (2013.01); *B29C 65/10* (2013.01); *B29C 65/1412* (2013.01); *B29C 65/1425* (2013.01); *B29C 65/16* (2013.01); *B29C 65/1635* (2013.01); *B29C 65/1658* (2013.01); *B29C 65/1661* (2013.01); *B29C 65/1667* (2013.01); *B29C 65/1696* (2013.01); *B29C 65/18* (2013.01); *B29C 65/20* (2013.01); *B29C 65/38* (2013.01); *B29C 65/5057* (2013.01); *B29C 65/72* (2013.01); *B29C 66/731* (2013.01); *B29C 66/73921* (2013.01); *B29K 2067/00* (2013.01); *B29K 2067/003* (2013.01); *B29K 2067/006* (2013.01); *B29K 2077/00* (2013.01); *C08F 2500/01* (2013.01); *C08L 23/04* (2013.01); *C08L 33/24* (2013.01); *C08L 67/02* (2013.01); *C08L 2207/04* (2013.01); *C08L 2207/062* (2013.01); *C08L 2207/064* (2013.01); *C08L 2207/068* (2013.01); *C09J 2423/003* (2013.01); *C09J 2423/006* (2013.01); *C09J 2423/008* (2013.01); *C09J 2431/003* (2013.01); *C09J 2451/003* (2013.01); *C09J 2467/006* (2013.01); *C09J 2477/006* (2013.01)

(58) Field of Classification Search
USPC ......................................... 428/483
See application file for complete search history.

(56) References Cited

U.S. PATENT DOCUMENTS

| 2008/0217821 A1 | 9/2008 | Goring et al. |
| 2011/0056966 A1 | 3/2011 | Feichtinger et al. |

FOREIGN PATENT DOCUMENTS

| DE | 10 2005 056 286 | 5/2007 |
| JP | 60021249 A * | 2/1985 |

(Continued)

OTHER PUBLICATIONS

JP 600212249A Machine Translation Nagamura et al. (Year: 1985).*

(Continued)

*Primary Examiner* — Terressa Boykin
(74) *Attorney, Agent, or Firm* — Steven C. Bauman

(57) ABSTRACT

Disclosed is a method for welding a polyolefin plastic and a plastic based on at least one polymer containing carbonyl groups, using a primer which contains, in relation to the proportion of polymer, at least 20 wt. % of a polymer that comprises maleic anhydride or maleic anhydride derivative units. Also disclosed are correspondingly welded products.

20 Claims, No Drawings

(51) Int. Cl.
    *B29C 65/72*      (2006.01)
    *B29C 65/20*      (2006.01)
    *C08L 23/04*      (2006.01)
    *B29C 65/50*      (2006.01)
    *B29C 65/10*      (2006.01)
    *C08L 33/24*      (2006.01)
    *C08L 67/02*      (2006.01)

(56)           References Cited

FOREIGN PATENT DOCUMENTS

WO      2005/018915      3/2005
WO      2008/113821      9/2008

OTHER PUBLICATIONS

International Search Report issued in connection with International Patent Application No. PCT/EP2016/074656 dated Dec. 5, 2016.
Hansen Solubility Parameters: A User's Handbook, Charles M. Hansen (second edition; Taylor & Francis Group; 2007; ISBN-10 0-8493-7248-8).
Huixia Liu et al: Study on Welding Mechanism based on Modification of Polypropylene for Improving the Laster Transmission Weldability to PA66, Materials, vol. 8, No. 8, Aug. 4, 2015, pp. 4961-4977.
Lu C et al: Weld line morphology and strength of polystryrene/polyamide-6/poly(styrene-co-maleic anhydride) blends, European Polymer Journal, Pergamon Press Ltd., Oxford, GB, vol. 40, No. 11, Nov. 2004, pp. 2565-2572.

* cited by examiner

METHOD FOR WELDING A POLYOLEFIN PLASTIC AND A PLASTIC BASED ON A POLYMER CONTAINING CARBONYL GROUPS

The present invention relates to a method for welding a polyolefin plastics material to a plastics material based on at least one polymer which contains carbonyl groups, using a primer, the primer containing, based on the polymer proportion of said primer, at least 20 wt. % of a polymer that comprises maleic acid anhydride units or maleic acid anhydride derivative units. The present invention also relates to correspondingly welded products.

Various methods are known from the prior art for interconnecting two or more substrates consisting of plastics materials, such as polyethylene (PE), polyacrylate or polyamide (PA). For this, there are both mechanical connection options, such as latch or screw connections, and adhesive bonding methods. Alternatively, plastics materials can also be welded to one another. Welding is a joining process for establishing an unbreakable, materially physical connection generally between similar plastics materials, such as between PE and PE or PA and PA. Similar thermoplastics are polymers that have substantially no differences from one another in terms of their molecular structure, melting temperature, melting viscosity and coefficient of thermal expansion and which can in principle only be mixed with one another to a limited extent. Usually, similar plastics materials are plastics materials having the same polymer base, or identical plastics materials.

A very wide range of methods are known for welding together two or more similar plastics materials. A very wide range of welding methods can be used, such as infrared welding, infrared/vibration welding or ultrasonic welding. These methods for welding similar plastics materials are based on the relevant plastics materials being melted in the region of the welding zone and the materials being integrally bonded and frictionally connected to one another in said zone.

These welding methods are effective for as long as similar plastics materials are intended to be interconnected. However, as soon as two plastics materials that are dissimilar to or incompatible with one another are intended to be welded together, for example plastics materials consisting of a polyamide and polyolefin, it is no longer possible for a long-lasting connection having a high degree of mechanical strength to be established between the two substrates. In a test in which the two plastics materials polyamide and polyolefin, for example polyethylene or polypropylene and polyamide 6, are directly welded to one another by means of the welding method known from the prior art, no strength or only very low degrees of strength are obtained.

Until now, corresponding different plastics materials could only be interconnected by means of a mechanical connection or an adhesive bonding method. A mechanical connection is disadvantageous in that attachment is complicated, there is material stress at certain points and an additional mechanical connection means is required. Furthermore, in a mechanical connection, it is rarely possible to achieve integrally bonded connections. However, an adhesive bonding method is disadvantageous in that the final strength of the connection is only achieved after a long period of time, possibly of up to several weeks. Furthermore, bonding of low-energy surfaces usually requires that the joining members be subject to a complex pretreatment process. In addition, an adhesive connection is often stable only for a limited time owing to external weathering. Moreover, providing a clean adhesive connection is often complicated and time-consuming. Therefore, establishing the connection by means of a method for welding plastics materials is the cleanest, quickest and simplest solution.

The object of the present invention is therefore to provide a simple method for welding a polyolefin plastics material to a plastics material based on at least one polymer which contains carbonyl groups. The connection between these different plastics materials should be as stable and permanent as possible owing to the weld seam.

It has surprisingly been found that this object is achieved by a method for welding a polyolefin plastics material to a plastics material based on at least one polymer which contains carbonyl groups, using a primer, the primer containing, based on the polymer proportion of said primer, at least 20 wt. % of at least one polymer that comprises maleic acid anhydride units or maleic acid anhydride derivative units.

When welding a polyolefin plastics material to a plastics material based on at least one polymer which contains carbonyl groups, the use of a primer containing at least one corresponding polymer resulted in it being possible to obtain particularly stable integrally bonded connections between the plastics materials.

The first joining member for being welded using a primer is a polyolefin plastics material, in particular a polyolefin thermoplastic. A polyolefin plastics material is based on polyolefin-based polymers, such as homopolymers and copolymers of alpha-olefins. The polyolefin-based polymers can be selected from the group consisting of poly-alpha-olefin homopolymers based on ethylene, propylene and/or butylene, in particular homopolymers of ethylene or propylene, and poly-alpha-olefin copolymers based on ethene, propene, 1-butene, 1-hexene and 1-octene, in particular ethylene/alpha-olefin and propylene/alpha-olefin copolymers, preferably copolymers of ethylene or propene with 1-butene, 1-hexene, 1-octene, or a combination thereof. In particular, the polyolefin plastics materials are selected from polyethylene plastics materials (in particular high-density/HD polyethylene, medium-density/MD polyethylene, low-density/LD polyethylene, ultra high molecular weight/UHMW polyethylene and linear low-density/LLD polyethylene, preferably HD polyethylene, MD polyethylene or LD polyethylene, plastics materials) and polypropylene plastics materials. The polyolefin plastics material is particularly preferably a polypropylene plastics material.

The polyolefin polymers, in particular polypropylene polymers, preferably have a weight-average molar mass (weight average Mw) of greater than 10,000 g/mol, in particular greater than 20,000 g/mol, preferably greater than 50,000 g/mol, particularly preferably greater than 100,000 g/mol. The polyolefin polymers, in particular polypropylene polymers, preferably have a weight-average molar mass (weight average Mw) of less than 2,000,000 g/mol, in particular less than 1,000,000 g/mol, preferably less than 500,000 g/mol. Particularly preferred polyethylene polymers have a weight-average molar mass (weight average Mw) of from 50,000 g/mol to 1,000,000 g/mol, in particular from 200,000 g/mol to 500,000 g/mol. Other preferred polyethylene polymers (UHMW-PE polymers) have a weight-average molar mass of greater than 2,000,000 g/mol, in particular between 4,000,000 and 6,000,000 g/mol. Particularly preferred polyolefin polymers, in particular polypropylene polymers, have a weight-average molar mass (weight average Mw) of from 50,000 g/mol to 250,000 g/mol.

The polyolefin plastics materials, in particular polypropylene plastics materials, may also contain further components, e.g. fillers, such as glass fibers, pigments, dyes, rheological aids, mold release aids or stabilizers. More than 80 wt. %, in particular more than 90 wt. %, preferably more than 98 wt. %, of the polyolefin plastics material, in particular polyethylene and/or polypropylene plastics material, preferably polypropylene plastics material, preferably consists of the mentioned polyolefin polymers, in particular the mentioned polyethylene and/or polypropylene polymers, preferably polypropylene polymers, based in each case on the polymer proportion of the polyolefin plastics material (total polyolefin plastics material without fillers). More than 50 wt. %, in particular more than 70 wt. %, preferably more than 90 wt. %, more preferably more than 95 wt. %, particularly preferably more than 98 wt. %, of the polyolefin plastics material, preferably polypropylene plastics material, preferably consists of the mentioned polyolefin polymers, in particular the polypropylene, based in each case on the total polyolefin plastics material (with fillers).

The second joining member for being welded using a primer is a plastics material based on a polymer which contains carbonyl groups. Within the context of the invention, "based on a polymer which contains carbonyl groups" means that at least 50 wt. %, preferably 70 wt. %, of the polymer proportion of the plastics material consists of the polymer which contains carbonyl groups. The polymer which contains carbonyl groups is preferably a polyamide or a polyester, in particular a polyterephthalate ester.

The polyamide plastics material is preferably a thermoplastic polyamide. The amide-based thermoplastic polymers include, for example: polyamide 6, a homopolymer of epsilon-caprolactam (polycaprolactam); polyamide 11, a polycondensate of 11-aminoundecanoic acid (poly-11-aminoundecanoic amide); polyamide 12, a homopolymer of omega-laurolactam (polylaurolactam); polyamide 6.6, a homopolycondensate of hexamethylenediamine and adipic acid (polyhexamethylene adipamide); polyamide 6.10, a homopolycondensate of hexamethylenediamine and sebacic acid (polyhexamethylene sebacamide); polyamide 6.12, a homopolycondensate of hexamethylene diamine and dodecanedioic acid (polyhexamethylene dodecanamide) or polyamide 6-3-T, a homopolycondensate of trimethylhexamethylene diamine and terephthalic acid (polytrimethyl hexamethylene terephthalic amide), poly(p-phenylene-terephthalic amide) or poly(m-phenylene terephthalic amide) of phenylene diamine and terephthalic acid, polyphthalamide PPA of different diamines and terephthalic acid, and mixtures thereof.

Optically transparent polyamides comprise microcrystalline polyamides containing linear aliphatic dicarboxylic acids and cycloaliphatic diamines, amorphous polyamides containing linear aliphatic dicarboxylic acids and cycloaliphatic diamines and optionally lactams or amino carboxylic acids, amorphous polyamides containing terephthalic acid and cycloaliphatic or branched aliphatic diamines and optionally lactams or amino carboxylic acids or amorphous polyamides containing isophthalic acid and cycloaliphatic or linear or branched aliphatic diamines and optionally lactams or amino carboxylic acids. Suitable optically transparent polyamides are, for example, amides of dodecanedioic acid and an isomer mixture of 4,4'-bis(aminocyclohexyl)-methane, of terephthalic acid and the isomer mixture of 2,2,4- and 2,4,4-trimethylhexamethylene diamine, of dodecanedioic acid and the isomer mixture of 3,3'-dimethyl-4,4'-bis(aminocyclohexyl)-methane, of laurolactam, isophthalic acid and the isomer mixture of 3,3'-dimethyl-4,4'-bis(aminocyclohexyl)-methane or of tetradecanedioic acid and the isomer mixture of 3,3'-dimethyl-4,4'-bis(aminocyclohexyl)-methane or of epsilon-caprolactam or omega-laurolactam.

Preferred polyamides are selected from the group consisting of polyamide 6, polyamide 6.6, polyamide 6.10, polyamide 6.12, polyamide 10.10, polyamide 11, polyamide 12, polyamide 10.12, polyphthalamides, optically transparent polyamides or mixtures based on said polyamides. Particularly preferred polyamides are selected from polyamide 6, polyamide 6.6, polyamide 12, polyphthalamides, optically transparent polyamides and mixtures thereof, in particular polyamide 6, polyamide 6.6, polyamide 12, polyphthalamides, and mixtures thereof. The polyamide plastics materials may also contain further components, e.g. fillers, such as glass fibers, pigments, mineral particles, dyes, rheological aids, mold release aids or stabilizers. More than 40 wt. %, in particular more than 60 wt. %, preferably more than 70 wt. %, more preferably more than 90 wt. %, of the polyamide plastics material preferably consists of the mentioned polyamides, based in each case on the total polyamide plastics material (with fillers). More than 90 wt. %, in particular more than 95 wt. %, preferably more than 98 wt. %, of the polyamide plastics material preferably consists of the mentioned polyamides, based in each case on the polymer proportion of the polyamide plastics material (total polyamide plastics material without fillers). The polyamide plastics materials preferably have a content of the mentioned polyamides of between 50 and 90 wt. %, in particular between 60 and 80 wt. %, based in each case on the total polyamide plastics material (with fillers).

Suitable polyester plastics materials are likewise known per se and described in the literature. Preferred polyester plastics materials comprise a polyester having an aromatic ring derived from an aromatic dicarboxylic acid in the main chain. The aromatic ring can also be substituted, for example by halogens such as chlorine or bromine or by C1-C4 alkyl groups such as methyl, ethyl, i- or n-propyl groups or n-, i- or t-butyl groups. The polyesters can be prepared in a manner known per se by reacting aromatic dicarboxylic acids, the esters thereof or other ester-forming derivatives thereof with aliphatic dihydroxy compounds. Preferred dicarboxylic acids include naphthalene dicarboxylic acid, orthophthalic acid, terephthalic acid and isophthalic acid or mixtures thereof. Up to 30 mol. % of the aromatic dicarboxylic acids can be replaced by aliphatic or cycloaliphatic dicarboxylic acids such as adipic acid, azelaic acid, sebacic acid, dodecanedioic acid and cyclohexanedicarboxylic acid. Of the aliphatic dihydroxy compounds, diols having 2 to 8 carbon atoms, in particular 1,2-ethanediol, 1,4-butanediol, 1,6-hexanediol, 1,4-hexanediol, 1,4-cyclohexanedimethanol and neopentyl glycol or mixtures thereof are preferred. Particularly preferred polyesters include polyalkylene terephthalates that are derived from alkanediols having 2 to 6 C atoms.

The polyester plastics materials are preferably selected from the group of polyethylene terephthalate (PET), polyethylene naphthalate, polybutylene naphthalate and polybutylene terephthalate (PBT) plastics materials and mixtures thereof, in particular polyethylene terephthalate (PET) and polybutylene terephthalate (PBT) plastics materials and mixtures thereof. The polyester plastics materials may also contain further components, e.g. fillers, such as glass fibers, pigments, mineral particles, dyes, rheological aids, mold release aids or stabilizers. More than 40 wt. %, in particular more than 60 wt. %, preferably more than 70 wt. %, more preferably more than 90 wt. %, of the polyester plastics material, in particular the PET or PBT plastics material, preferably consists of the mentioned polyesters, based in each case on the total polyester plastics material (with fillers). More than 90 wt. %, in particular more than 95 wt. %, preferably more than 98 wt. %, of the polyester plastics material preferably consists of the mentioned polyesters, based in each case on the polymer proportion of the polyester plastics material (total polyester plastics material without fillers). The polyester plastics materials preferably have a content of the mentioned polyesters of between 50 and 90 wt. %, in particular between 60 and 80 wt. %, based in each case on the total polyester plastics material (with fillers).

Another essential component of the invention is the use of at least one primer, preferably exactly one primer. The primer contains, based on the polymer proportion of said primer, at least 20 wt. %, in particular at least 50 wt. %, preferably at least 70 wt. %, of at least one polymer which contains maleic acid anhydride units or maleic acid anhydride derivative units, in particular maleic acid anhydride units.

The primer is a welding aid which is preferably applied, as a pretreatment layer, to at least one of the surfaces of the substrates to be welded in the region of the joining zone. The primer is not to be understood to be an adhesive, cleaning agent or the like, but rather the primer is a welding aid, by means of which the joining members in the joining zone (or welding zone) are made compatible with one another, thus producing an integrally bonded and frictional connection between the substrates to be welded in the joining zone during joining.

Tests have shown that by using a corresponding primer, containing a polymer according to the invention, the plastics materials to be joined can be compatibilized in the joining weld during welding and thus a stable and long-lasting connection can be achieved. Without the use of a corresponding primer, no strength or only very low degrees of strength of the welded connection could be achieved. The joined substrates preferably have a tensile strength of more than 2 MPa, in particular more than 5 MPa. The tensile strength is determined using a traction speed of 5 mm/s according to the procedure described in respect of the tests.

The at least one first polymer is a polymer, in particular a copolymer, which contains in its polymer backbone maleic acid anhydride groups that have been reacted or polymerized therein. The polymers can contain the maleic acid anhydride groups in the backbone in a polymerized form, for example in a copolymer of at least one maleic acid anhydride monomer and acrylate and/or alpha-olefin monomers, or in a grafted form, as in polyolefins grafted with maleic acid anhydride. A maleic acid anhydride or maleic acid anhydride derivative, in particular maleic acid anhydride, can be reacted or polymerized into the polymer. An example of a maleic acid anhydride derivative is 1,2,3,6-tetrahydrophthalic acid anhydride which comprises the relevant 5-membered anhydride group.

The at least one polymer of the primer is particularly preferably a polyolefin grafted with maleic acid anhydride, in particular a polyethylene grafted with maleic acid anhydride or polypropylene grafted with maleic acid anhydride.

In another particularly preferred embodiment, the primer preferably contains a copolymer which contains, in addition to the maleic acid anhydride or maleic acid anhydride derivative, one or more polymerized monomers selected from the group of acrylates and methacrylates (together (meth)acrylates), in particular (meth)acrylates that have an alkyl functional group having 1 to 12 carbon atoms, preferably 1 to 4 carbon atoms, preferably ethyl and butyl(meth) acrylate, (meth)acrylic acid and alpha-olefins, in particular ethene, propene, 1-butene, 1-hexene and 1-octene, preferably ethene. Furthermore, functional monomers can also be used that have functionalities, for example epoxide or isocyanate groups, carboxyl or amino groups, and also alkoxysilane groups. The at least one copolymer particularly preferably contains in the polymer at least one maleic acid anhydride (derivative), one (meth)acrylate and one alpha-olefin, preferably a maleic acid anhydride, a (meth)acrylate having a C1 to C4 alkyl functional group and an ethylene or propylene.

The polymers can be synthesized from the monomers in a known manner. In addition, the polymers can be grafted in a polymer-like reaction. Particularly preferred reaction partners for grafting purposes are alcohols, thiols, amines, isocyanates, anhydrides, carboxylic acids, in particular alcohols, preferably alcohols having 1 to 6 carbon atoms, such as methanol and isobutanol. For grafting, the maleic acid anhydride monomers or maleic acid anhydride units can be reacted in the polymer with the reaction partner, in particular esterified by alcohols. Preferably, only some of the maleic acid anhydride groups are reacted or esterified, in particular less than 70% of the maleic acid anhydride groups. It is particularly preferable for the maleic acid anhydride groups to be unreacted and still present as anhydride groups. In the preferred embodiment, the maleic acid anhydride groups can also be present in a partially hydrolyzed form. The maleic acid anhydride groups being fully reacted can result in a reduction in the strength of the resulting weld connection.

Polymers having a maleic acid anhydride content of greater than or equal to 0.001 wt. %, in particular greater than or equal to 0.01 wt. %, preferably greater than or equal to 0.02 wt. %, particularly preferably greater than or equal to 0.05 wt. %, based on the polymer, are particularly advantageous. The polymers advantageously have a maleic acid anhydride content of between 0.01 and 15 wt. %, in particular between 0.02 and 10 wt. %, preferably between 0.5 and 5 wt. %, based on the polymer. In another preferred embodiment, the polymers have a maleic acid anhydride content of between 2 and 30 wt. %, in particular between 5 and 15 wt. %, based on the polymer. The strength of the welded connection is particularly high with polymers having a corresponding maleic acid anhydride content.

The polymers advantageously have a weight-average molecular weight Mw of greater than or equal to 5,000 g/mol, in particular greater than or equal to 50,000 g/mol, preferably greater than or equal to 100,000 g/mol. The polymers preferably have a weight-average molecular weight Mw in the range of between 5,000 and 2,000,000 g/mol, in particular between 50,000 and 1,000,000 g/mol, preferably between 100,000 and 500,000 g/mol. Polymers having a corresponding weight-average molecular weight have a positive effect on the brittleness and strength of the obtained connection. The weight-average molecular weight can be determined by means of GPC by comparison with a polystyrene standard.

In addition to the first polymer, the primer may preferably contain at least one further polymer. The at least one further polymer is preferably compatible with at least one of the two plastics materials to be welded and with the primer copolymer. Particularly preferably, the primer contains at least one polyolefin and/or polyamide polymer, preferably those specified above in each case. The use of an additional polymer in the primer, in addition to the copolymer according to the invention, can further improve the strength.

As a compatible further polymer, a polymer is preferably used that has a weighted quadratic distance of the Hansen parameters $(R_a)^2$ of less than 22 MPa, in particular less than 17 MPa, preferably less than 15 MPa, particularly preferably less than 12 MPa, relative to one, in particular both, of the plastics materials to be joined, and in particular also relative to the above-mentioned first polymer according to the invention.

The weighted quadratic distance of the Hansen parameters $(R_a)^2$ is determined according to the following formula:

$$(R_a)^2 = 4(\Delta\delta_D)^2 + (\Delta\delta_P)^2 + (\Delta\delta_H)^2$$

In this formula, $\delta_D$ is the Hansen parameter for the London dispersion force, $\delta_P$ is the Hansen parameter for the polarity and $\delta_H$ is the Hansen parameter for the hydrogen bonds. $\Delta\delta_D$, $\Delta\alpha_P$ and $\Delta\delta_H$ each represent the differences in these Hansen parameters of the comparable plastics materials or polymers, e.g. $\Delta\delta_D = (\delta_{D1} - \delta_{D2})$ of polymers 1 and 2. The values of the individual Hansen parameters $\delta_D$, $\delta_P$ and $\delta_H$ for the relevant plastics materials or polymers is determined according to the book "Hansen Solubility Parameters: A User's Handbook" by Charles M. Hansen (second edition; Taylor & Francis Group; 2007; ISBN-10 0-8493-7248-8). Several values for individual polymers can already be found in this source. According to the method described in this book, the Hansen parameters can preferably be derived using the HSPIP program (4th edition 4.1.07) from the database supplied therewith, or, if not available, can be determined using the contained "DIY" functionality of the program, preferably using the neural network supplied therewith, as described in the guide. The HSPIP program is available from Steven Abbott TCNF Ltd.

The content of the further polymer, in particular a polyolefin polymer and/or polyamide polymer, in the primer is preferably between 1 and 40 wt. %, in particular between 5 and 30 wt. %, particularly preferably between 10 and 20 wt. %, based in each case on the total weight of the primer. The content of the further polymer in the polymer content of the primer is preferably between 5 and 70 wt. %, in particular between 20 and 60 wt. %, particularly preferably between 30 and 50 wt. %, based in each case on the total polymer proportion of the primer (primer without solvent and without fillers).

In addition to the polyolefin polymer according to the invention and the further polymer, the primer may also contain a solvent, in particular an organic solvent. The primer preferably has a solvent content of between 10 and 95 wt. %, in particular between 50 and 90 wt. %, particularly preferably between 70 and 85 wt. %, based in each case on the total weight of the primer.

Suitable solvents are all conventional solvents, such as water, alcohols such as ethanol, alkanes such as isooctane, ketones such as methyl isobutyl ketone (MIBK) or cyclohexanone (CH), ethers such as diethyl ether or tetrahydrofurane (THF), esters such as acetic acid ethyl ester, or carbonates such as dimethyl or dipropyl carbonate, toluene, xylene or mixtures thereof.

If organic solvents are used, the total polymer content of the primer is preferably between 1 and 90 wt. %, in particular between 2 and 50 wt. %, particularly preferably between 5 and 15 wt. %, based in each case on the total weight of the primer. The total polymer content corresponds to the content of all polymers used in the polymer, in particular the polymers according to the invention and the above-described further polymers.

In another preferred embodiment, the primer is present in the form of an aqueous dispersion or emulsion. In this case, the polymer according to the invention or, if present, the further polymers are emulsified or dispersed in water. In this case, the total polymer content of the primer is preferably between 5 and 90 wt. %, in particular between 20 and 70 wt. %, particularly preferably between 30 and 55 wt. %, based in each case on the total weight of the primer. For the aqueous dispersion/emulsion, it is advantageous for the polymer component to consist substantially of only the polymer according to the invention and the optionally present above-mentioned further polymer, in particular only the polymer according to the invention or the mixture thereof. According to the invention, the term "substantially of" is understood to mean that more than 95 wt. %, preferably more than 97 wt. %, very particularly preferably more than 99 wt. %, of the polymer component consists of the polymer according to the invention and the optionally present above-mentioned further polymer, in particular only the polymer according to the invention.

In a particularly preferred embodiment, the primer is substantially free of solvents.

In addition to the polymer according to the invention, the above-mentioned further polymers and a solvent, the primer may contain further components, such as fillers, (fluorescent) dyes and pigments, rheological aids, defoaming aids, wetting aids, stabilizers or plasticizers. Apart from dyes and pigments, the primer is however preferably substantially free of further components, in particular substantially free of any other components. According to the invention, the expression "substantially free of" is understood to mean that the primer contains less than 5 wt. %, preferably less than 1 wt. %, very particularly preferably less than 0.1 wt. %, of the relevant substances, and in particular does not contain the relevant substances at all.

In the method according to the invention for welding a polyolefin plastics material to a plastics material based on at least one polymer which contains carbonyl groups, a primer is used, the primer containing, based on the polymer proportion of said primer, at least 20 wt. % of a polymer that comprises maleic acid anhydride units or maleic acid anhydride derivative units.

In this method, the primer is used as an aid for welding the two different plastics materials by melting in each case. The used primer containing a polymer according to the invention makes it possible to establish compatibility between the two joining members, as a result of which it is possible to establish a stable, long-lasting and integrally bonded connection between the two plastics materials.

The primer can be applied to the surface of one or both of the joining members using a wide range of methods. For example, it can be applied by means of a dosing device, by means of a needle and dosing robot, by injection molding, by extrusion, by being applied as a film, by being applied as a hot melt, by spraying, by spreading or by dipping. The primer can be applied to just one or both of the surfaces of the substrates to be welded. The primer is preferably only applied to one surface, in particular the polyamide surface.

If the primer contains a solvent, the primer is dried after being applied to one or both of the surfaces, preferably until the solvent has evaporated to such an extent that there is a non-tacky, dimensionally stable primer layer. In particular, the primer can be welded after just a few seconds and up to several weeks. The primer is preferably dried following application for at least one hour, preferably for at least 12 hours.

The primer is preferably applied to one or both of the surfaces of the substrates to be welded such that the primer has a layer thickness of from 1 µm to 10,000 µm, in particular from 100 to 5,000 µm, preferably from 500 to 3,000 µm, particularly preferably from 1,000 to 2,000 µm. In particular, layer thicknesses of greater than 100 µm are preferred. If a solvent is contained in the primer, layer thickness refers to the primer dried by the solvent.

After the primer has been applied to one or both of the surfaces of the substrates to be welded and after said primer has optionally been dried, the substrates to be welded can be interconnected using a conventional welding method. Plastics materials are generally welded by the joining members being locally plasticized in the joining plane and joined under pressure. The process parameters are selected such that significant compressive yielding of the melt leads to an optimal connection between the joining members in the joining plane. Heating can occur by convection, contact heating, radiation or friction. The different energy input for plasticizing can be achieved in a number of ways and leads to different processes for welding plastics materials. Suitable welding methods include:

Hot gas welding [HG]
Convective heating by means of a hot gas stream, generally air; two-stage process
Hot plate welding [HE]
Contact heating; two-stage process
Ultrasonic welding [US]
Heating by friction; a transverse wave in the ultrasonic range leads to heating at the interface, one-stage process
High frequency welding [HF]
Heating by internal friction; polar molecules are oriented according to a high-frequency magnetic field; one-stage; only used for polar plastics materials and films
   Vibration welding [VIB] (friction welding: linear; orbital; spin; angle) Heating by friction; one-stage process
   Laser welding [LW] (contour; simultaneous; quasi-simultaneous; mask)
Heating by radiation; coherent radiation; laser transmission welding; generally one-stage (two-stage possible)
Infrared welding [IR]
Heating by radiation; incoherent radiation; two-stage The above-mentioned welding methods can optionally also be combined, for example infrared welding with vibration welding. The plastics materials are particularly preferably welded by a welding method selected from: hot plate welding, thermal contact or thermal impulse welding, warm gas welding or hot gas welding, vibration welding, microwave or induction welding, laser butt welding or laser transmission welding, infrared welding, ultrasonic welding, and combinations thereof, and in particular selected from: infrared welding, hot plate welding, vibration welding, ultrasonic welding, and combinations thereof.

A method intended for integrally bonding the two plastics materials using the primer and including the following steps is particularly preferred:
   providing the first plastics material that has a first joining zone,
   providing the second plastics material that has a second joining zone,
   preheating the first joining zone,
   applying the primer to the preheated first joining zone, in particular with solvent-free primers,
   bringing the first joining zone provided with the primer into contact with the second joining zone,
   integrally bonding the first joining zone to the second joining zone, in particular by using conventional methods for welding plastics materials, such as infrared welding, hot plate welding, warm gas welding, vibration welding and ultrasonic welding.

The interpretation as per DIN 1910-3:1977-09 can generally be used for welding plastics materials. Therefore, welding plastic materials can be understood to mean integrally bonding thermoplastics using heat and/or pressure. The heating can be carried out on the basis of contact heating (welding by solid bodies), convection heating (welding by warm gas), radiation heating (welding by a beam), heating by friction (welding by movement), and welding by an electric current, for example.

In an advantageous development, a primer is used that is selected and adapted to the method such that application to a heated and/or hot joining zone having a temperature that is lower than the decomposition temperature of the polymers in the primer does not affect the inner chemical crosslinking of the primer.

It is advantageous for the first joining zone of the first plastics material to be preheated. For the preheating, aids and techniques that are known to a person skilled in the art and suitable for the intended purpose can be used. In particular, the use of warm gas or a plasma is suitable for the preheating. Preheating by means of radiation, in particular infrared radiation or laser radiation, is also conceivable. A hot plate or a heated tool can also be used to preheat the first joining zone. Finally, preheating in a furnace or a heated chamber is also conceivable. It is also conceivable to preheat the entire plastics material and thus also said joining zone. However, alternatively or additionally, preheating only the joining zone itself is also possible.

In an advantageous development, the spacing from the heating device during the preheating to the plastics material, in particular to the first joining zone to be preheated, in particular from the heat-dissipating region of the heating device or the heat-producing region of the heating device or the effective surface of the heating device to be preheated or the region of the heating device opposite the first joining zone, is in a range of from 0.5 mm to 100 mm, preferably in the range of from 1 mm to 60 mm. Alternatively, it is also conceivable for heating to take place by means of and/or during contact in particular of the first joining zone by the heating element of the heating device.

Another advantage is selecting the plastics material for the first joining member and adjusting the method parameters to the first plastics material such that the first joining zone is melted during the preheating and such that a melt layer is produced in the first joining zone during the preheating. In a preferred embodiment, the thickness of the melt layer is preferably in the range of from 0.05 mm to 6 mm, particularly preferably in the range of from 0.1 mm to 5 mm. A melt layer of this kind can lead to improved adhesion and/or diffusion and/or interaction between the molecules and, in conjunction with a certain flow, to an improved connecting layer. If the boundary layer of the first plastics material is in the molten state, interactions or even chemical bonds with the primer may occur. The melt layer can depend in particular on the component geometry and the particular component design. The method parameters are preferably adjusted and/or selected such that no deformation of the components occur. The temperature differences between the joining zones and the primer to be applied are preferably equalized by suitable measures and/or method steps. In this case, it is conceivable in particular to preheat the primer in order to reduce the temperature difference between the preferably thermoplastic primer and the first joining zone. This can counteract the rapid cooling of the first joining zone between the process steps, for example.

Preferably before the step of preheating the first joining zone, the first joining zone is optionally pretreated. Alternatively or additionally, the second joining zone may also be pretreated. Cleaning by means of a solvent or a plastics cleaner that is for example an alkaline is also conceivable as a possible pretreatment, for example. Mechanical pretreatment can also be used, in particular by means of scraping, sanding, brushing or blasting. Conceivable chemical pretreatments are in particular acid cleaning or the use of reactive gases. Furthermore, the use of thermal, chemical and/or physical pretreatment could be proven expedient, in particular by means of a gas flame or plasma arc. Alternatively or additionally, electrical pretreatment by means of corona discharge, in which the first joining zone and/or the second joining zone is exposed to an electrical corona discharge, can thus cause polar molecules to be formed on the corresponding surface. Another possibility is plasma treatment, preferably using a plasma nozzle for pretreating the joining zone, in particular in order to achieve activation and/or cleaning of the corresponding surface. At the same time, providing a coating by means of a plasma may also prove to be expedient. Another possibility is flame treating the joining zone in order to increase the surface tension in suitable plastics materials. Another type of pretreatment is exposure to UV radiation, electron radiation, radioactive radiation or irradiation by means of a laser. Finally, the pretreatment may be such that a coating is provided, in particular a coat of paint or an adhesion promoter. It is also conceivable to pretreat the first plastics material or the joining zones of the first plastics material with a longer time interval before the preheating. It is thus conceivable, for example, to carry out the pretreatment as part of the manufacturing process of the first plastics material, in order for it to be possible to further process the pretreated plastics material in the method according to the invention.

There are various possibilities for the manner in which the primer is applied. For example, and in particular in the industrial sector, application by means of an automated application aid, in particular by means of a dosing robot, is conceivable. Said robot may be equipped with a needle and/or a height sensor in order to be able to carry out complex dosing processes. The primer may also be applied by means of injection molding, by the primer being plasticized in an injection-molding machine and being injected, under pressure, into the mold that contains the first plastics material having the first joining zone. Alternatively, a film application is conceivable, a film consisting of the primer first being produced in a first step by means of film blowing or flat-film extrusion. The film can then be cut to any shape by means of a cutting or punching process, for example, and applied to the first joining zone in a further step following the mentioned preheating. In this case, the use of films/sheets having a thickness in the range of between 1 μm and 5,000 μm has proven to be expedient. Other conceivable application options include extrusion welding, in which the primer is present in the form of a welding wire or can be melted in an extruder and applied to the first joining zone in molten form. The primer may also be provided in the form of a welding wire in order to make it possible to apply said primer by means of hot-air welding. Another option is to apply the primer by means of a spraying process. Pretreatment and/or preheating and/or locally varying temperature control of the injection mold is also possible during application by means of injection molding. Of course, other types of application that are known to a person skilled in the art and suitable for the specific use are also conceivable.

Another advantage is the further heating of the first joining zone while the primer is being applied, in particular in order to prevent a drop in temperature of the first joining zone between the preheating and the application of the primer. This can be carried out by the above-described method step for preheating, which can be continued during the application for the sake of convenience. Alternatively or additionally, additional heating in particular by means of a further method step is possible. It may be proven expedient, for example, to simultaneously heat the first joining zone, for example by simultaneously exposing the first joining zone to radiation, forced convection or contact heating during the application, in order to prevent a drop in temperature of the first joining zone after the preheating.

In an advantageous development, the primer is applied such that a connecting layer having a thickness in the range of from 1 μm to 5 mm, preferably in the range of from 10 μm to 3 mm, is arranged on the first joining zone. The thickness of the connecting layer is understood to mean the material thickness of the connecting layer on the first joining zone.

Another advantage is applying the primer to the first joining zone by means of a dosing device with relative movement between the first joining zone and the dosing device, the first joining zone, to which the primer is applied, being preheated before the primer is applied and by means of a heating device with relative movement between the first joining zone and the heating device, the primer being applied by means of the dosing device when the first joining zone is in the preheated state.

In this case, it has proven particularly advantageous for the heating device to be guided over the first joining zone during preheating at a speed in the range of from 10 mm/min to 100 m/min, preferably in the range of from 10 mm/min to 30 m/min.

It may also be advantageous for the heating device to lead the dosing device preferably at a defined and constant spacing. It is in particular advantageous to carry out the method such that the primer is applied to the first joining zone by means of a dosing device with relative movement of the dosing device and the first joining zone in the range of from 10 mm/min to 100 m/min, preferably in the range of from 10 mm/min to 30 m/min, said joining zone, to which the primer is applied, being preheated before the primer is applied and by means of a heating device with relative movement of the heating device and the first joining zone, the heating device preferably simultaneously leading the dosing device or a nozzle of the dosing device in order to apply the primer in a time interval in the range of from 0.1 to 10 s.

In this case, it has proven to be particularly advantageous to use a coating unit consisting of a dosing device and a heating device. A coating unit can be understood in particular to mean a unit that provides a fixed connection between the heating device and the dosing device such that the heating device leads the dosing device preferably at a defined and constant spacing during the relative movement, in order to ensure that the first joining zone is preheated immediately before the primer is applied. Of course, being able to adjust the spacing or, in the case of convective preheating, adjusting the volume flow or nozzle diameter of the medium, in particular by means of suitable mechanical, electromechanical or even pneumatically operated, adjusters, is also conceivable here.

However, the coating unit may also be understood to be a heating device and a dosing device as two assemblies that are completely separate from one another but enter into the same or substantially the same relative movement with respect to the plastics material, in order to ensure that the application location of the primer is preheated immediately before said primer is applied.

In an advantageous development, although the heating device and the dosing device enter into substantially the same primary relative movement or basic direction with respect to the plastics material, at least one of the two mentioned devices undergoes, in addition to said primary relative movement, an additional relative movement with respect to the plastics material. The heating device and/or the dosing device can thus enter into one or more secondary relative movements, for example, in addition to the primary relative movement in which the primer can also be applied, for example. For example, in particular the heating device and/or the dosing device can enter into or undergo a secondary relative movement that circles or meanders around the primary relative movement.

In this case, the plastics material, on the one hand, or the heating device and the dosing device or both devices together as a coating unit, on the other hand, can be moved. In this case, it is possible for the heating device and the dosing device or both devices together as a coating unit, on the one hand, or the plastics material, on the other hand, to be idle or to be moved in a different direction together with the relevant moving part.

In an advantageous development, a primary relative movement is produced at a speed in a range of from 10 mm/min to 100 m/min, preferably in the range of from 10 mm/min to 30 m/min, resulting, in particular also by means of a suitable design of the heating device, for example, in dwell times of the plastics material within the heating area of the heating device that are as short as possible, in particular in the range of from 1 s to 60 s. Said heating area can be understood to mean the region or space around the heating device which has an influence on temperature in the sense of a temperature increase, i.e. preheating of the first joining zone of the first plastics material. Too much heating and damage or impairment to the plastics material can thus be prevented, for example.

In addition, it may be proven advantageous, in particular for connecting the dosing device and/or the heating device on/in existing production lines, to equip the heating device with a bus interface, in particular a Profibus or a real-time Ethernet interface.

After said primer has been applied, the second joining zone is brought into contact with the primer layer. Here, securing the two plastics materials to one another may be proven expedient, in particular using clamping devices or similar securing aids known to a person skilled in the art.

Before the step of bringing the second joining zone into contact with the primer layer, the second joining zone can of course optionally be pretreated. In this case, in particular all of the above-described pretreatment techniques are conceivable. It is also conceivable to pretreat the second plastics material or the joining zones of the second plastics material with a longer time interval before the contact. It is thus conceivable, for example, to carry out the pretreatment as part of the manufacturing process of the second plastics material, in order for it to be possible to further process a pretreated plastics material in the method according to the invention. Pretreatment of the second plastics material may also include applying the primer to the second joining zone. In this case, it is conceivable to preferably also preheat the second joining zone before applying the primer. The above embodiments are likewise preferred at this juncture.

The above-described contact between the second joining zone and the primer is followed by a joining process in which the treated and/or coated joining members are plasticized by supplying heat and preferably integrally bonded to one another under the effect of pressure. For said integrally bonded connection between the second joining zone and the primer, it is conceivable for heat to be supplied by means of thermal conduction, for example by means of hot plate welding and/or thermal contact welding and/or thermal impulse welding; by means of friction, in particular ultrasonic welding, friction/vibration welding or high-frequency welding, microwave or induction welding; by means of convection, for example warm gas welding or hot gas welding; by means of radiation, for example infrared welding, laser butt welding or laser transmission welding, or even by means of a combination of two or more of these techniques.

A further subject of this invention relates to objects or products produced using the method according to the invention.

This invention also relates to the use of a primer according to the invention for welding a polyolefin plastics material to a plastics material based on at least one polymer which contains carbonyl groups.

PRACTICAL EXAMPLES

Used Materials and Abbreviations

PA=polyamide
PA 6=polycaprolactam
PA 6.6=poly(N,N'-hexamethylene adipic acid diamide)
PA 12=polylauryllactam
PA 6.12=poly(hexamethylene dodecanediamide)
PPA=polyphthalamide
PP=polypropylene
PE=polyethylene
PET=polyethylene terephthalate
PBT=polybutylene terephthalate
MAH=maleic acid anhydride
Primer 1=PP-MAH with MFR (230° C.; 2.16 kg)=7-12
Primer 2=PE-(MD)-MAH with MFR (190° C.; 21.6 kg)=12-22
Primer 3=PE-(LD)-MAH with MFR (190° C.; 21.6 kg)=1.6
Primer 4=PE-(LLD)-MAH with MFR (190° C.; 21.6 kg)=2.5
Primer 5=terpolymer of ethylene, butyl acrylate and maleic acid anhydride
Primer 6=terpolymer of ethylene, ethyl acrylate and maleic acid anhydride
Primer 7=polyolefin; acrylate and MAH modified; Mw=67,500 g/mol
Test fuel composition:

|  | FAM B in vol. % |
| --- | --- |
| methanol | 15.00 |
| water | 0.50 |
| toluene | 42.25 |
| isooctane | 25.35 |
| diisobutylene | 12.68 |
| ethanol | 4.23 |
| total | 100.00 |

IR: infrared welding; IR-VIB: infrared/vibration welding; US: ultrasonic welding
Production of the Test Pieces:

In order to produce the test pieces, the primers, polymers 1 to 4 and the plastics materials to be welded were melted (230° C.) in the plasticizing unit of an injection-molding machine and processed so as to form plates of 130 mm×68 mm×3 mm.

The 130 mm×3 mm surface of the plates was welded edge to edge to PE, PP, PA and PPA of the same surface area in each case by means of IR welding and vibration welding in order to test compatibility with these materials. Twenty-four hours after welding, 8 mm of the two sides of the welded plate was sawn off, and what remained of the plate was halved (cut perpendicularly to the joining plane) and tested at room temperature using the tensile test at a test speed of 5 mm/s.

The following table indicates the tensile strength (in MPa) that could be obtained for the welded test pieces for each combination of the primer with the used plastics material and welding method:

| Polymer 1 | Polymer 2 | Primer | Welding method | Tensile strength MPa |
|---|---|---|---|---|
| PA6 GF30 ULTRAMID B3WG6 | — | PP-MAH | VIB | 12.6 |
| PPA PA6T/6I/66 GF33 Amodel AE-1133NT | — | PP-MAH | VIB | 7.0 |
| PP Moplen HP501L | — | PP-MAH | VIB | 20.7 |
| PA6 GF30 ULTRAMID B3WG6 | — | PE-(MD)-MAH | VIB | 7.42 |
| PA6 GF30 ULTRAMID B3WG6 | — | PE-(LD)-MAH | VIB | 6.31 |
| PA6 GF30 ULTRAMID B3WG6 | — | PE-(LLD)-MAH | VIB | 5.77 |
| PE Lupolen GX5038 | — | PE-(MD)-MAH | VIB | 12.21 |
| PE Lupolen GX5038 | PA6 GF30 ULTRAMID B3WG6 | — | VIB | 0 |
| PP Moplen HP501L | PA6 GF30 ULTRAMID B3WG6 | — | VIB | <2.5 |
| PP Moplen HP501L | PPA PA6T/6I/66 GF33 Amodel AE-1133NT | — | VIB | <2.5 |

The table shows excellent degrees of strength of the primer for PA, PPA and PP. Pure PP and pure PE without a primer only exhibited very low strength for PA and PPA and decomposed after welding without significant amounts of force being applied.

The primer was injected onto polyamide or PE in a multicomponent injection-molding process. For this purpose, polyamide and PE plates of 150 mm×66.2 mm×4 mm were first injection molded and inserted into a cavity of 150 mm×75 mm×4 mm, and the primer polymer was injected onto the PA or PE plastics material in a further injection-molding process. The injected primer layer was machined to a thickness of 1.8 mm. The primer layer was welded to another plastics material and the welded plates were sawn and tested as described above.

The following table indicates the tensile strength (in MPa) that could be obtained for the welded test pieces for each combination of the primer with the used plastics material and welding method:

| Polymer 1 | Polymer 2 | Primer | Primer on | Welding method | Tensile strength MPa |
|---|---|---|---|---|---|
| PE(HD) Lupolen GX5038BG25 | PA6 GF30 ULTRAMID B3WG6 | PE-(MD)-MAH | PA | IR | 3.66 |
| PE(HD) Lupolen GX5038BG25 | PA6 GF30 ULTRAMID B3WG6 | PE-(MD)-MAH | PA | VIB | 2.80 |
| PE(HD) Lupolen GX5038BG25 | PA12 GF30 Grilamid LV-3A H | PE-(MD)-MAH | PA | IR | 5.76 |
| PE(HD) Lupolen GX5038BG25 | PA12 GF30 Grilamid LV-3A H | PE-(MD)-MAH | PA | VIB | 4.47 |
| PE(HD) Lupolen GX5038BG25 | PA6 GF30 ULTRAMID B3WG6 | — | PA | IR | 0 |
| PE(HD) Lupolen GX5038BG25 | PA6 GF30 ULTRAMID B3WG6 | — | PA | VIB | 0 |
| PE(HD) Lupolen GX5038BG25 | PA12 GF30 Grilamid LV-3A H | — | PA | IR | 0 |
| PE(HD) Lupolen GX5038BG25 | PA12 GF30 Grilamid LV-3A H | — | PA | VIB | 0 |
| PE(HD) Lupolen GX5038BG25 | PPA PA6T/6I/66 GF33 Amodel AE-1133NT | — | — | IR | 0 |
| PE(HD) Lupolen GX5038BG25 | PPA PA6T/6I/66 GF33 Amodel AE-1133NT | — | — | VIB | 0 |
| PE(HD) Lupolen GX5038BG25 | PPA PA6T/6I/66 GF33 Amodel AE-1133NT | PE-(MD)-MAH | PE | IR | 5.18 |
| PE(HD) Lupolen GX5038BG25 | PPA PA6T/6I/66 GF33 Amodel AE-1133NT | PE-(MD)-MAH | PE | VIB | 9.17 |
| PE(HD) Lupolen GX5038BG25 | PPA PA6T/6I/66 GF33 Amodel AE-1133NT | PE-(MD)-MAH | PE and PPA | IR | 8.98 |
| PE(HD) Lupolen GX5038BG25 | PPA PA6T/6I/66 GF33 Amodel AE-1133NT | PE-(MD)-MAH | PE and PPA | VIB | 7.80 |
| PE(HD) Lupolen GX5038BG25 | PPA PA6T/6I/66 GF33 Amodel AE-1133NT | PE-(MD)-MAH | PPA | IR | 9.02 |

-continued

| Polymer 1 | Polymer 2 | Primer | Primer on | Welding method | Tensile strength MPa |
|---|---|---|---|---|---|
| PE(HD) Lupolen GX5038BG25 | PPA PA6T/6I/66 GF33 Amodel AE-1133NT | PE-(MD)-MAH | PPA | VIB | 8.86 |

The plastics materials welded using the primer layer exhibited excellent strength. Without the primer, the plastics materials decomposed after welding without significant amounts of force being applied.

Aging of the Welded Plastics Materials:

The following table shows the polymers used and the associated primers. Primer polymer plates and a primer applied to a plastics material in the multicomponent injection-molding process were VIB welded to another plastics material, according to the above-described method. Aging took place at room temperature in test fuel FAM-B and in two different alternating climate tests. The obtained degrees of strength at room temperature and a traction speed of 5 mm/s are given, in MPa, in the following table:

| Polymer 1 | Polymer 2 | Primer/on plastics material | Welding method | Storage | Tensile strength MPa |
|---|---|---|---|---|---|
| PA6 GF 30 Ultramid B3WG6 | PE Lupolen GX5038 | — | VIB | 24 h, 20° C. | 0.00 |
| PA6 GF 30 Ultramid B3WG6 | PE Lupolen GX5038 | PE-(MD)-MAH/ PA6 | VIB | 24 h, 20° C. | 7.42 |
| PA6 GF 30 Ultramid B3WG6 | PE Lupolen GX5038 | PE-(MD)-MAH/ PA6 | VIB | 14 days in FAM-B | 6.08 |
| PE Lupolen GX5038 | — | PE-(MD)-MAH | VIB | 24 h, 20° C. | 15.83 |
| PE Lupolen GX5038 | — | PE-(MD)-MAH | VIB | 80 h (10 cycles) alternating climate from −40° C. to 70° C. | 16.45 |
| PPA PA6T/6I/66 GF33 Amodel AE-1133NT | — | PE-(MD)-MAH | VIB | 24 h, 20° C. | 9.06 |
| PPA PA6T/6I/66 GF33 Amodel AE-1133NT | — | PE-(MD)-MAH | VIB | 80 h (10 cycles) alternating climate from −40° C. to 70° C. | 7.49 |
| PPA PA6T/6I/66 GF33 Amodel AE-1133NT | PE Lupolen GX5038 | PE-(MD)-MAH/ PPA | VIB | 24 h, 20° C. | 9.02 |
| PPA PA6T/6I/66 GF33 Amodel AE-1133NT | PE Lupolen GX5038 | PE-(MD)-MAH/ PPA | VIB | 80 h (10 cycles) alternating climate from −40° C. to 70° C. | 2.37 |
| PA6 GF 30 Ultramid B3WG6 | — | PE-(MD)-MAH | IR | 24 h, 20° C. | 8.04 |
| PA6 GF 30 Ultramid B3WG6 | — | PE-(MD)-MAH | IR | 140 h (35 cycles) alternating climate from −30° C. to 80° C. | 6.62 |
| PA6 GF 30 Ultramid B3WG6 | — | PE-(MD)-MAH | IR | 14 days in FAM-B | 6.08 |
| PA12 GF30 Grilamid LV3AH | — | PE-(MD)-MAH | IR | 24 h, 20° C. | 9.11 |
| PA12 GF30 Grilamid LV3AH | — | PE-(MD)-MAH | IR | 140 h (35 cycles) alternating climate from −30° C. to 80° C. | 8.13 |

The welded plastics materials comprising the primer exhibited excellent resistance to aging in the test media used and under the used test conditions.

Terpolymers as the Primer:

In another process, primer 5 (terpolymer of ethylene, butyl acrylate and maleic acid anhydride) and, primer 6 (terpolymer of ethylene, ethyl acrylate and maleic acid anhydride) were tested. Primer 5 was pressed in a heating press at 220° C. so as to form a 0.5 mm thick film, melted onto PE by means of a warm gas and IR-VIB welded to PA. Primer 6 was melted at 280° C. and welded to PE and PA by means of hot plate welding.

The following table indicates the tensile strength (in MPa) that could be obtained for the welded test pieces for each combination of the primer with the used plastics material and welding method:

| Polymer 1 | Polymer 2 | Primer | Welding method | Tensile strength MPa |
|---|---|---|---|---|
| PE(HD) Lupolen GX5038BG25 | PA6 GF30 Durethan | Primer 5 | IR-VIB | 7.47 |
| PE(HD) Lupolen GX5038BG25 | PA6 GF30 Durethan | — | IR-VIB | 0 |
| PE(HD) Lupolen GX5038BG25 | PA6 GF30 Durethan | Primer 6 | hot plate | 3-4 |
| PE(HD) Lupolen GX5038BG25 | PA6 GF30 Durethan | — | hot plate | 0 |

The plastics materials welded using the primer layer exhibited excellent strength. Without the primer, the plastics materials decomposed after welding without significant amounts of force being applied.

Hot Plate Welding of PET and PBT Using Polymer Primer 1 and 7:

At 310° C., PP, PET and PBT were melted on the hot plate on the 30 mm×4 mm surface for 20 s, 15 s and 30 s, respectively, the two plastics materials to be joined were dipped into a melt of the primer polymer and the polymers coated with primer were joined at low pressure. For this purpose, primer polymers 1 and 7 were used. After 24 hours at room temperature, the welded samples were tested at room temperature in a tensile test machine at a test speed of 5 mm/s. The polymer combinations and the used primer polymer are shown together with the associated degrees of strength in the following table:

| Polymer 1 | Polymer 2 | Primer polymer | Tensile strength in MPa |
|---|---|---|---|
| PP Hostacom M4N01 | PET Genius 72 | — | 3.43 |
| | | 1 | 6.44 |
| | | 7 | 6.33 |
| PP Hostacom M4N01 | PBT GF20 Pocan B3225 | — | 1.19 |
| | | 1 | 4.48 |
| | | 7 | 3.87 |

Good degrees of strength of the welded samples could be obtained using the specified primer polymers. Without the primer, the samples welded using a hot plate only had low strength.

What is claimed is:

1. A method for welding a polyolefin plastics material that has a first joining zone to a plastics material based on at least one polymer which contains carbonyl groups that has a second joining zone, using a primer, the method comprising:
providing the polyolefin plastics material,
providing the plastics material based on at least one polymer which contains carbonyl groups,
preheating the first joining zone of the polyolefin plastics material,
applying the primer to the preheated first joining zone,
bringing the first joining zone provided with the primer into contact with the second joining zone of the plastics material based on at least one polymer which contains carbonyl groups, and
integrally bonding the first joining zone to the second joining zone
wherein the primer contains, based on the polymer proportion of said primer, at least 20 wt. % of at least one polymer that comprises maleic acid anhydride units or maleic acid anhydride derivative units.

2. The welding method according to claim 1, wherein the polyolefin plastics material is selected from the group consisting of polyethylene plastics material and polypropylene plastics material.

3. The welding method according to claim 1, wherein the plastics material based on at least one polymer which contains carbonyl groups is selected from the group consisting of a polyester plastics material and a polyamide plastics material.

4. The welding method according to claim 1, wherein the at least one polymer of the primer is selected from the group consisting of copolymers of at least one maleic acid anhydride monomer and at least one acrylate monomer and/or alpha-olefin monomer and polyolefins grafted with maleic acid anhydride.

5. The welding method according to claim 1, wherein the at least one polymer of the primer has a maleic acid anhydride content of between 0.01 and 35 wt.

6. The welding method according to claim 1, wherein the at least one polymer of the primer has a weight-average molecular weight Mw in the range of between 5,000 and 2,000,000 g/mol.

7. The welding method according to claim 1, wherein the primer further comprises at least one further polymer which is compatible with at least one of the two plastics materials to be welded.

8. The welding method according to claim 1, wherein the primer contains at least one solvent and has a solvent content of between 10 and 95 wt based on the total weight of the primer.

9. An object produced using the welding method according to claim 1.

10. The method according to claim 2, wherein the polyethylene plastics material is selected from the group consisting of HD polyethylene, MD polyethylene, LD polyethylene, UHMW polyethylene and LLD polyethylene plastics material.

11. The method according to claim 3, wherein the polyester plastics material is a polyterephthalate ester plastics material.

12. The method according to claim 5, wherein the at least one polymer of the primer has a maleic acid anhydride content of between 0.02 and 25 wt. % based on the polymer.

13. The method according to claim 5, wherein the at least one polymer of the primer has a maleic acid anhydride content of between 0.05 and 20 wt. % based on the polymer.

14. The method according to claim 5, wherein the at least one polymer of the primer has a maleic acid anhydride content of between 0.05 and 15 wt. % based on the polymer.

15. The method according to claim 6, wherein the at least one polymer of the primer has a weight-average molecular weight Mw in the range of between 50,000 and 1,000,000 g/mol.

16. The method according to claim 6, wherein the at least one polymer of the primer has a weight-average molecular weight Mw in the range of between 100,000 and 500,000 g/mol.

17. The method according to claim 7, wherein the primer further comprises at least one polyamide polymer and/or one polyolefin polymer.

18. The method according to claim 8, wherein the primer comprises water.

19. The method according to claim 8, wherein the primer has a solvent content of 50 and 85 wt. % based on the total weight of the primer.

20. The method according to claim 8, wherein the primer has a solvent content of between 60 and 80 wt. % based on the total weight of the primer.

* * * * *